US010562313B2

(12) United States Patent
Kiyohara

(10) Patent No.: US 10,562,313 B2
(45) Date of Patent: Feb. 18, 2020

(54) SYSTEM FOR MANAGING APPROPRIATENESS OF USE OF CONSUMABLES FOR PRINTING APPARATUS AND METHOD FOR MANAGING APPROPRIATENESS OF USE OF CONSUMABLES FOR PRINTING APPARATUS

(71) Applicant: SCREEN HOLDINGS CO., LTD., Kyoto (JP)

(72) Inventor: Satoru Kiyohara, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/698,223

(22) Filed: Sep. 7, 2017

(65) Prior Publication Data

US 2018/0072064 A1    Mar. 15, 2018

(30) Foreign Application Priority Data

Sep. 9, 2016 (JP) ................. 2016-176620

(51) Int. Cl.
*B41J 2/175*     (2006.01)
*G06F 16/955*   (2019.01)
*G06K 19/06*    (2006.01)

(52) U.S. Cl.
CPC ....... *B41J 2/17546* (2013.01); *B41J 2/17533* (2013.01); *B41J 2/17559* (2013.01); *G06F 16/9554* (2019.01); *G06K 19/06037* (2013.01)

(58) Field of Classification Search
CPC ......... B41J 2/17553; B41J 2/17546; B41J 2/17509; B41J 2/17503; B41J 2/175; B41J 2/17543; B41J 2/17559; B41J 2/17533; G06F 16/9554; G06K 19/06037
USPC ................................... 347/7, 84–86
See application file for complete search history.

(56) References Cited

U.S. PATENT DOCUMENTS 6,345,891 B1   2/2002  Childers et al.
2005/0185034 A1   8/2005  Anma et al.

FOREIGN PATENT DOCUMENTS

JP    11-198408 A    7/1999
JP    2002-059566 A    2/2002
JP    2009-040061 A    2/2009

*Primary Examiner* — Jannelle M Lebron
(74) *Attorney, Agent, or Firm* — McDermott Will & Emery LLP

(57) ABSTRACT

A bottle for ink supply is shipped with a two-dimensional code attached to the bottle, individual information being embedded in the two-dimensional code. A user reads the two-dimensional code with a portable information terminal and thereby transmits the individual information to a management server. If there is no fraud or problem, the management server transmits a passcode to the portable information terminal. When the bottle is placed in a bottle storing unit, the two-dimensional code is read by a two-dimensional code reader, and a passcode is created based on the individual information embedded in the two-dimensional code. Only when the passcode matches the passcode registered by the user, ink in the bottle becomes ready to use.

15 Claims, 13 Drawing Sheets

LOT#KY000195  LMCyan Rev2  3.0L  S/N0001950345

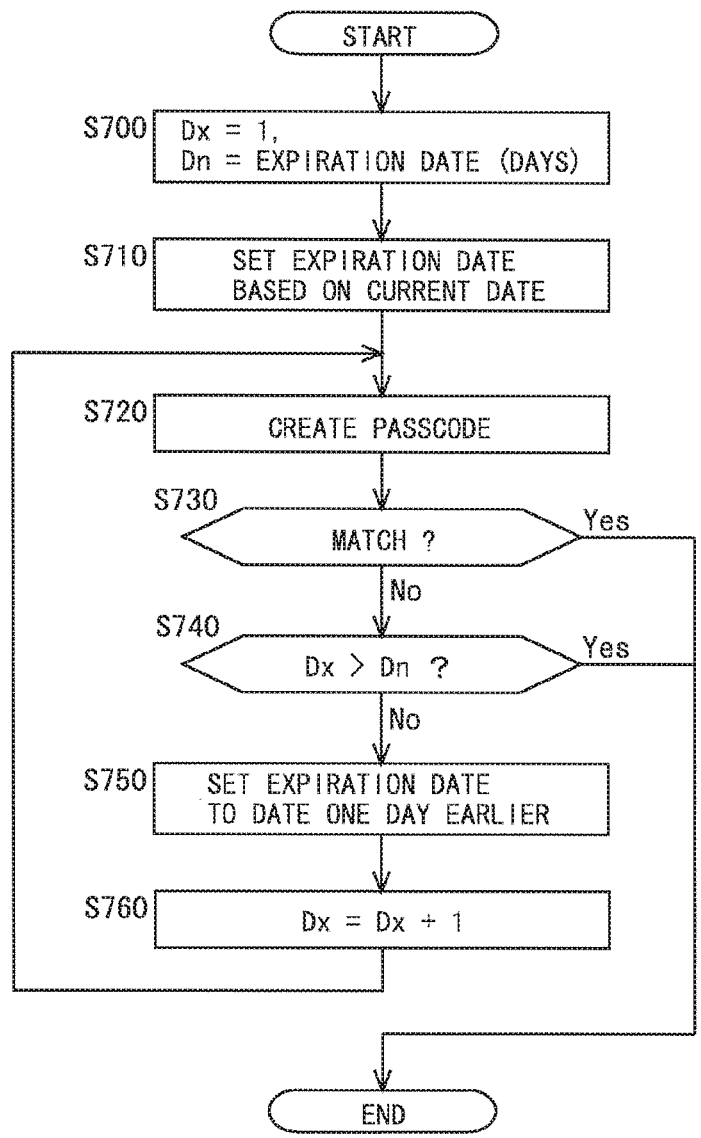

SYSTEM FOR MANAGING APPROPRIATENESS OF USE OF CONSUMABLES FOR PRINTING APPARATUS AND METHOD FOR MANAGING APPROPRIATENESS OF USE OF CONSUMABLES FOR PRINTING APPARATUS

BACKGROUND OF THE INVENTION

Field of the Invention

The present invention relates to a system and method for managing appropriateness of use of consumables used in a printing apparatus.

Description of Related Art

Conventionally, there is known an inkjet printing apparatus that performs printing by discharging ink onto a base material (printing paper, etc.) by heat or pressure. In such an inkjet printing apparatus, when it runs out of ink held therein, refill or replacement of ink is performed. Ink is generally supplied contained in a bottle (including a cartridge), and the inkjet printing apparatus is provided with bottle storing units that store bottles, for example, for respective ink colors.

Meanwhile, if a wrong color ink bottle is placed in a bottle storing unit or an incompatible ink bottle is placed in a bottle storing unit, normal printing is not performed on the inkjet printing apparatus. Hence, conventionally, using a writable IC chip or barcode, a check is performed as to whether a problem occurs with the use of a bottle (ink in the bottle) placed in the bottle storing unit (hereinafter, referred to as an "appropriateness check"). For example, an IC chip that holds ink color information is attached in advance to a bottle, and if a user places a wrong color bottle in the bottle storing unit, then the inkjet printing apparatus displays an error message based on information held in the IC chip. In addition, an IC chip that holds information on the amount of ink remaining may be attached in advance to a bottle. An inkjet printing apparatus that uses such a bottle rewrites the information on the amount of ink remaining depending on to the discharge of ink, and thereby manages the amount of ink remaining in the bottle. Then, when the amount of ink remaining becomes small, a message indicating such a fact is displayed.

Note that in relation to inventions concerning this matter, the following prior art documents are known. Japanese Laid-Open Patent Publication No. 2002-59566 discloses an invention of an inkjet printing system that allows performing efficient and highly reliable transmission and reception of ink volume information about ink supply sources between an ink container and a controller. Japanese Laid-Open Patent Publication No. 11-198408 discloses an invention of an inkjet recording apparatus that determines whether ink is appropriate to a recording head, and inhibits filling of the recording head with the ink if the ink is not appropriate, and thereby prevents damage to the recording head. Japanese Laid-Open Patent Publication No. 2009-40061 discloses an invention of an ink supply system in which in a configuration in which an ink tank is provided with a memory element and a light-emitting unit, even when a plurality of cartridges are used, accurate information can be presented to a user while an increase in the number of signal lines is suppressed.

As described above, conventionally, an appropriateness check as to the use of ink is performed using a writable IC chip or barcode. However, there may be a case in which it is found after a bottle for ink supply is shipped from a factory, etc., that there is a problem with ink contained in the bottle (e.g., mixing of foreign matter in the process of manufacturing the ink). In such a case, with the conventional appropriateness check, a problem with ink cannot be detected. In addition, if, in such a case, the ink with a problem is used, then a reduction in print quality or damage to the apparatus may occur.

SUMMARY OF THE INVENTION

An object of the present invention is therefore to implement a system and a method that are capable of inhibiting use of consumables (typically, ink) for a printing apparatus when a problem with the consumables is found after shipment.

One aspect of the present invention is directed to a system for managing appropriateness of use of consumables for a printing apparatus, the system including:

an information recording unit attached to a container containing consumables for a printing apparatus, individual information of the container being recorded in the information recording unit;

a management apparatus configured to manage quality information about consumables contained in each container;

a terminal apparatus configured to be able to read individual information recorded in an information recording unit attached to a target container, and transmit the read individual information to the management apparatus; and a printing apparatus including: a passcode input accepting unit configured to accept input of a passcode from an external source; and an information reading unit configured to read the individual information recorded in the information recording unit, the printing apparatus performing printout using the consumables, wherein when the management apparatus receives the individual information transmitted from the terminal apparatus, the management apparatus determines, based on the quality information, whether to allow use of consumables contained in the container corresponding to the received individual information, and when the management apparatus determines to allow use of the consumables, the management apparatus creates a passcode based on the received individual information and transmits the created passcode to the terminal apparatus, and the printing apparatus performs a predetermined authentication verification process based on the individual information read by the information reading unit from the information recording unit attached to the target container and the passcode accepted by the passcode input accepting unit, to determine whether to allow use of the consumables contained in the target container.

According to such a configuration, when a user starts to use consumables, the user reads, using the terminal apparatus, individual information recorded in an information recording unit which is attached to a container containing the consumables, and thereby obtains a passcode from the management apparatus. Then, the printing apparatus determines whether to allow use of the consumables contained in the target container, by an authentication verification process performed based on the passcode inputted by the user using the passcode input accepting unit and individual information read by the information reading unit from the information recording unit attached to the target container. Here, only when the management apparatus determines to allow use of the consumables, a passcode is transmitted from the management apparatus to the terminal apparatus. Thus, when there is a problem with consumables and use of the consumables is not allowed by the management apparatus, the user cannot make the consumables ready to use, and accordingly, the consumables with a problem are inhibited from being put in the printing apparatus. As such, upon the start of use of consumables, a check as to whether there is a problem with the consumables can be performed in real time. Thus, when a problem with consumables contained in a container for consumables supply is found after shipment, use of the consumables (putting of the consumables in the printing apparatus) can be inhibited.

Another aspect of the present invention is directed to a system for managing appropriateness of use of consumables for a printing apparatus, the system including:

an information recording unit attached to a container containing consumables for a printing apparatus, individual information of the container being recorded in the information recording unit;

a management apparatus configured to manage quality information about consumables contained in each container; and a printing apparatus including an information reading unit configured to read the individual information recorded in the information recording unit; and configured to be connectable to the management apparatus, the printing apparatus performing printout using the consumables, wherein the printing apparatus reads, by the information reading unit, individual information recorded in an information recording unit attached to a target container, and transmits the read individual information to the management apparatus, when the management apparatus receives the individual information transmitted from the printing apparatus, the management apparatus determines, based on the quality information, whether to allow use of consumables contained in the container corresponding to the received individual information, and transmits result data representing a result of the determination to the printing apparatus, and the printing apparatus determines, based on the result data transmitted from the management apparatus, whether to allow use of the consumables contained in the target container.

A still another aspect of the present invention is directed to a method for managing appropriateness of use of consumables for a printing apparatus, the method including:

a consumables shipping step of shipping a container containing consumables for a printing apparatus, with an information recording unit attached to the container, individual information of the container being recorded in the information recording unit;

an individual information transmitting step of reading individual information recorded in an information recording unit attached to a target container, and transmitting the read individual information to a management apparatus that manages quality information about consumables contained in each container, the individual information transmitting step being performed by a terminal apparatus;

a passcode transmitting step of receiving the individual information transmitted from the terminal apparatus, determining, based on the quality information, whether to allow use of consumables contained in the container corresponding to the received individual information, and creating a passcode based on the received individual information to transmit the created passcode to the terminal apparatus when it is determined to allow use of the consumables, the passcode transmitting step being performed by the management apparatus;

a passcode input accepting step of accepting input of a passcode from an external source; and a use-of-consumables allowed/not-allowed determining step of reading the individual information recorded in the information recording unit attached to the target container by using an information reading unit provided in advance, and performing a predetermined authentication verification process based on the read individual information and the passcode accepted in the passcode input accepting step, to determine whether to allow use of the consumables contained in the target container, the use-of-consumables allowed/not-allowed determining step being performed by a printing apparatus.

These and other objects, features, modes, and effects of the present invention will be made clear from the following detailed description of the present invention with reference to the accompanying drawings.

BRIEF DESCRIPTION OF THE DRAWINGS

FIG. 18 is a flowchart showing a procedure of the creation of a passcode and a matching check in a print control apparatus in the fifth variant.

DETAILED DESCRIPTION OF PREFERRED EMBODIMENTS

Embodiments of the present invention will be described below with reference to the accompanying drawings.

1. First Embodiment

A first embodiment of the present invention will be described. A system according to the present embodiment is a system for managing appropriateness of use of ink which are consumables to be used for printing on an inkjet printing apparatus. The system is hereinafter referred to as an "appropriateness-of-use-of-consumables management system." Note that in the following a "manager" refers to a person (company) that manages the appropriateness of use of ink, and a "user" refers to a person (company) that uses the printing apparatus. Typically, an ink maker corresponds to the manager and the user performs printing on the printing apparatus using ink supplied by the manager. Note, however, that the actual operational mode is not particularly limited.

<1.1 Overall Configuration and Overview of the System>

Figure 1:
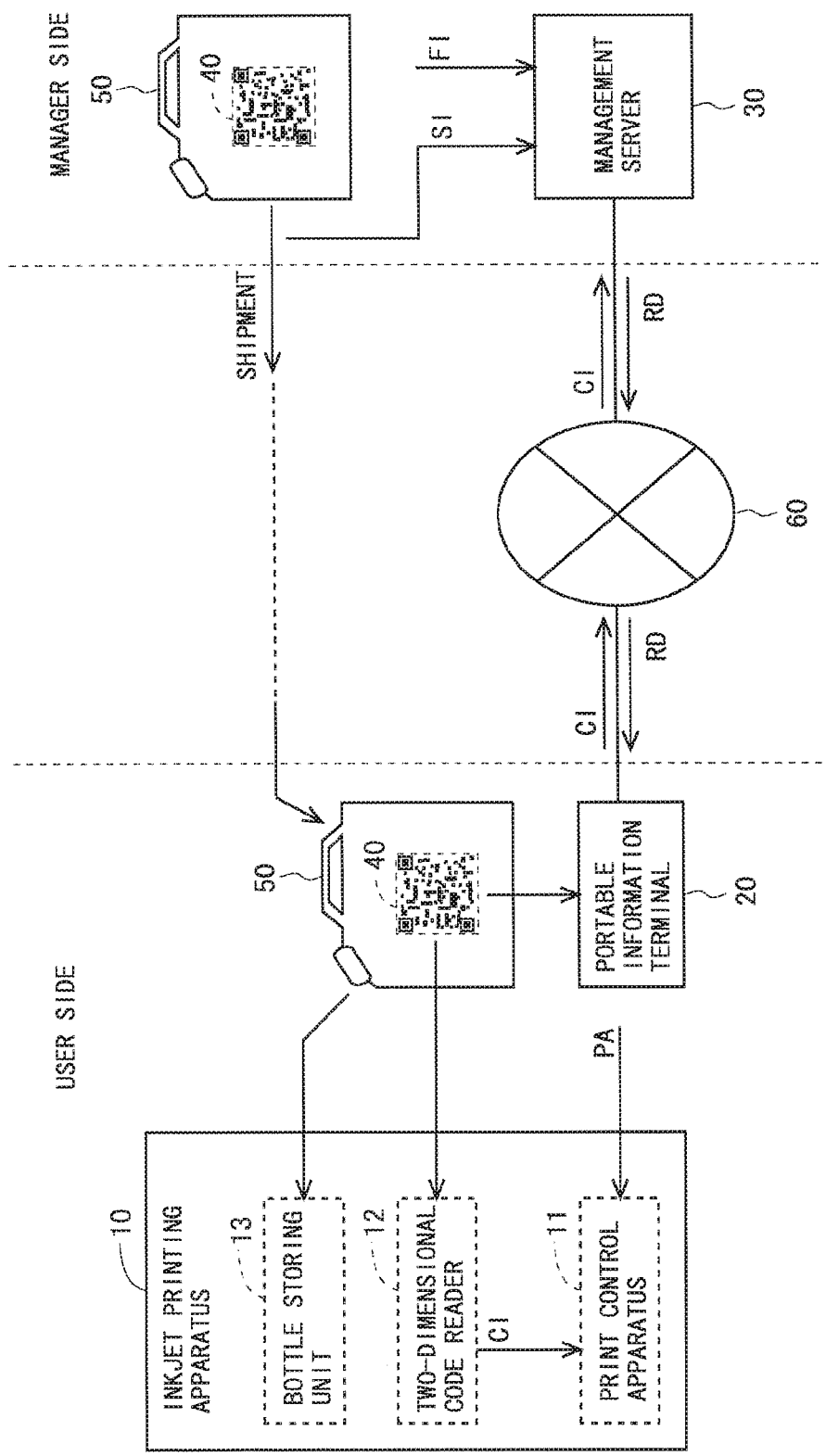
FIG. 1 is a diagram showing an overall configuration of an appropriateness-of-use-of-consumables management system according to a first embodiment of the present invention.

FIG. 1 is a diagram showing an overall configuration of an appropriateness-of-use-of-consumables management system according to the present embodiment. The appropriateness-of-use-of-consumables management system includes an inkjet printing apparatus 10; a portable information terminal 20; a management server 30; and a two-dimensional code 40 serving as an information recording unit having recorded therein individual information CI which is information on an each individual bottle (container) 50 used to supply ink (information on ink contained in the bottle 50). The inkjet printing apparatus 10 and the portable information terminal 20 are components on the user side. The management server 30 is a component on the manager side. The two-dimensional code 40 is a component to be attached to the bottle 50 for ink supply when the bottle 50 is shipped.

The inkjet printing apparatus 10 is a printing apparatus that performs printing on a base material (printing paper, etc.) using inks (water-based inks, UV-curable inks, etc.). The inkjet printing apparatus 10 includes a print control apparatus 11; a two-dimensional code reader 12 for reading the two-dimensional code 40; and a bottle storing unit 13 that stores the bottle 50 for ink supply. The inkjet printing apparatus 10 is configured such that, when the bottle 50 is placed in the bottle storing unit 13, the two-dimensional code 40 attached to the bottle 50 is read by the two-dimensional code reader 12.

The portable information terminal 20 used in the present embodiment has the function of reading the two-dimensional code 40. In addition, the portable information terminal 20 is connectable to the management server 30 through Internet 60. Note that in the present embodiment, unlike a second embodiment which will be described later, the inkjet printing apparatus 10 is not connected to the Internet 60.

Under a configuration such as that described above, the bottle 50 for ink supply is shipped with the two-dimensional code 40 attached to the bottle 50. When the bottle 50 is shipped, shipping information SI about the bottle 50 is registered in the management server 30. In addition, if a problem with ink contained in the bottle 50 (e.g., mixing of foreign matter) is found after the shipment of the bottle 50, problem information FI serving as quality information about the ink is registered in the management server 30. That is, the management server 30 holds the shipping information SI and the problem information FI.

After the user acquires the bottle 50 by purchase, etc., the user first reads the two-dimensional code 40 using the portable information terminal 20 upon the use of the bottle 50. By this, a connection from the portable information terminal 20 to the management server 30 is established, and the individual information CI embedded in the two-dimensional code 40 attached to the bottle 50 is sent from the portable information terminal 20 to the management server 30.

Based on the individual information CI sent from the portable information terminal 20, the management server 30 performs a check as to whether there is a fraud (hereinafter, referred to as a "fraud check") and a check as to whether there is a problem (hereinafter, referred to as a "problem check"). The fraud check is performed by referring to the shipping information SI, and the problem check is performed by referring to the problem information FI. When there is no fraud or problem, the management server 30 creates a passcode PA. Then, result data RD representing a result of the process by the management server 30 is transmitted to the portable information terminal 20. Note that when there is a fraud, data representing that the bottle 50 is fraudulent is transmitted as result data RD, when there is a problem, data representing that there is a problem is transmitted as result data RD, and when a passcode PA is created with no fraud or problem, the passcode PA is transmitted as result data RD.

When a passcode PA is transmitted as result data RD from the management server 30 to the portable information terminal 20, the user registers the passcode PA in the print control apparatus 11. With the passcode PA thus registered in the print control apparatus 11, the user places the bottle 50 in the bottle storing unit 13 of the inkjet printing apparatus 10. By doing so, the two-dimensional code 40 attached to the bottle 50 is read by the two-dimensional code reader 12. Then, the print control apparatus 11 performs a process of verifying whether authentication has been performed properly, based on the passcode PA registered by the user and the individual information CI embedded in the two-dimensional code 40. When, as a result, it is verified that authentication has been performed properly, the ink contained in the bottle 50 placed in the bottle storing unit 13 becomes ready to use.

Note that, in the present embodiment, a passcode input accepting unit is implemented by the print control apparatus 11, an information reading unit is implemented by the two-dimensional code reader 12, a container storing unit is implemented by the bottle storing unit 13, a terminal apparatus is implemented by the portable information terminal 20, a management apparatus is implemented by the management server 30, and an information recording unit is implemented by the two-dimensional code 40.

<1.2 Detailed Procedure>

Figure 2:
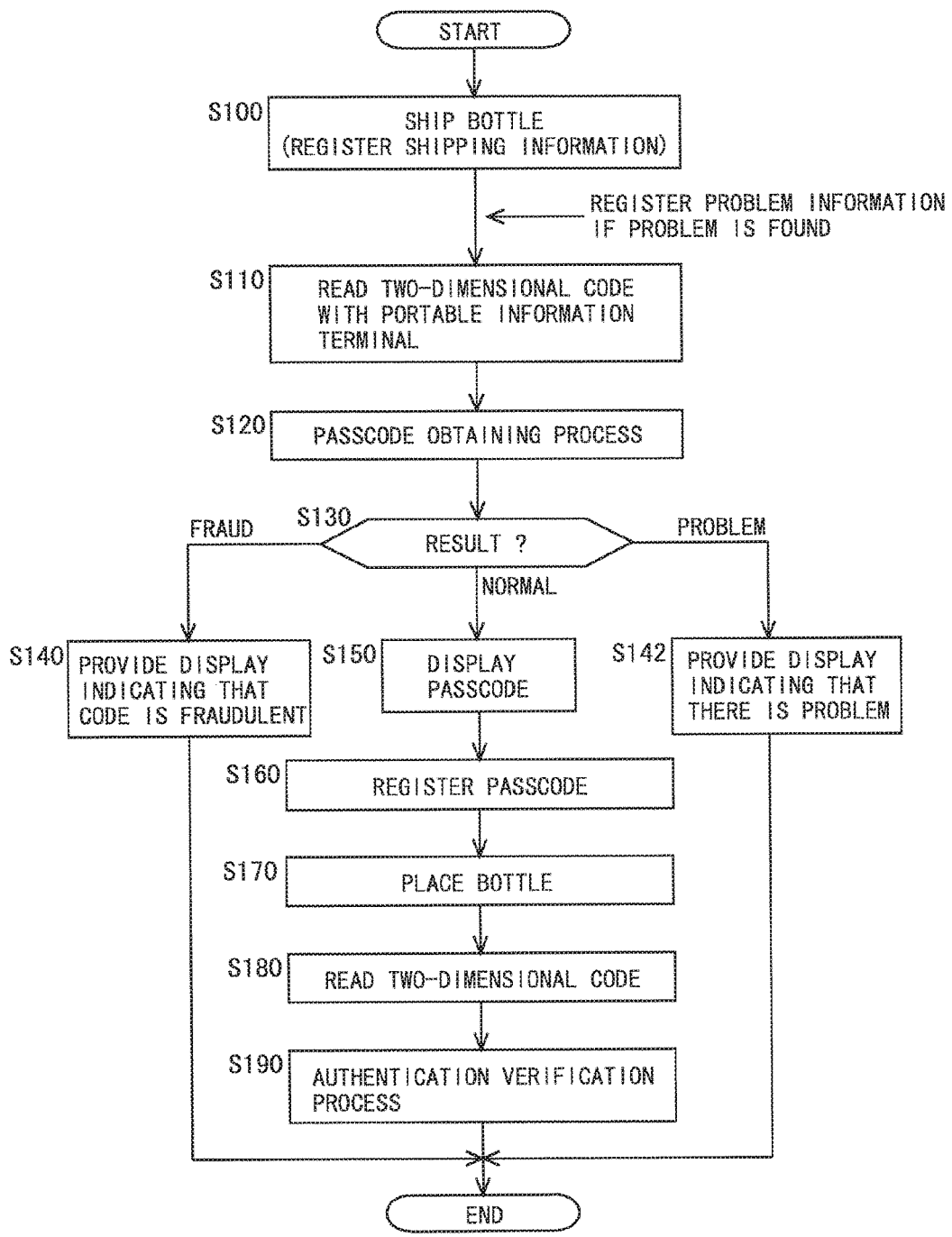
FIG. 2 is a flowchart showing an overall processing procedure in the appropriateness-of-use-of-consumables management system according to the first embodiment.
Figures 3, 4:
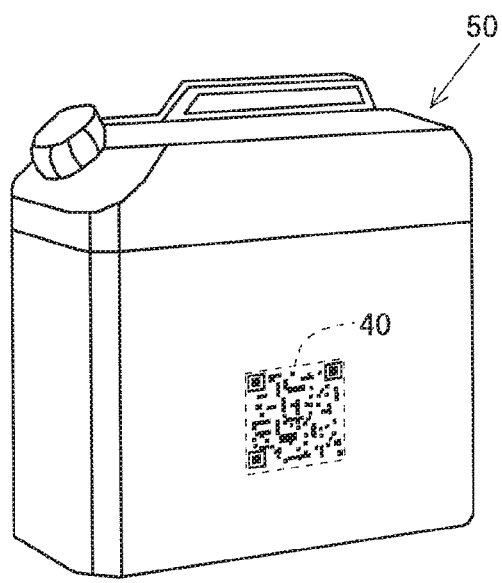
FIG. 3 is a diagram showing an example of a bottle to be shipped in the first embodiment.
FIG. 4 is a diagram showing an example of individual information embedded in a two-dimensional code in the first embodiment.

A detailed procedure from when a bottle 50 is shipped until ink in the bottle 50 becomes ready to use on the user side will be described below. FIG. 2 is a flowchart showing an overall processing procedure in the appropriateness-of-use-of-consumables management system according to the present embodiment. First, a bottle 50 containing ink is shipped with a two-dimensional code 40 attached to a surface thereof as shown in FIG. 3 (step S100). With the shipment, shipping information SI of the bottle 50 is registered in the management server 30. The shipping information SI is information including, for example, shipping date, shipping destination, lot number, ink color, the volume of ink, and serial number. The two-dimensional code 40 is a code in a display format having information in two directions, a horizontal direction and a vertical direction. For the two-dimensional code 40, typically, a QR code is adopted. As described above, individual information CI which is information on each individual bottle 50 (information on ink contained in the bottle 50) is embedded in the two-dimensional code 40.

Now, the individual information CI embedded in the two-dimensional code 40 will be described. As described above, the management server 30 performs a fraud check and a problem check. Hence, in order that the management server 30 can perform a fraud check and a problem check based on information sent from the portable information terminal 20, typically, information by which each individual bottle 50 can be identified is used as individual information CI. For example, information including lot number, ink color, the volume of ink, serial number, etc., is used as individual information CI. As an example, information such as that shown in FIG. 4 is embedded as individual information CI in the two-dimensional code 40. The meaning of each information shown in FIG. 4 is as follows. "LOT#KY000195" indicates that the lot number is "KY000195." "LMCyan" indicates that the ink contained in the bottle 50 is low-migration cyan ink. "Rev2" indicates that the revision number is "2." "3.0 L" indicates that the volume of ink contained in the bottle 50 is 3.0 liters. "S/N0001950345" indicates that the serial number is "0001950345."

Note that, in the present embodiment, URL information of the management server 30 is also embedded in the two-dimensional code 40. By this, when the portable information terminal 20 reads the two-dimensional code 40, a connection from the portable information terminal 20 to the management server 30 is established through the Internet 60.

When it is found after the shipment of the bottle 50 that there is a problem with the ink contained in the bottle 50 such as mixing of foreign matter, problem information FI is registered in the management server 30. For example, as the problem information FI, information on the lot number, color, etc., of the ink with a problem is registered in the management server 30.

After the user acquires the bottle 50, the user first reads the two-dimensional code 40 attached to the bottle 50 using the portable information terminal 20, so as to obtain a passcode PA from the management server 30 (step S110). Since the URL information of the management server 30 is also embedded in the two-dimensional code 40 in addition to the individual information CI of the bottle 50 as described above, by the reading of the two-dimensional code 40 with the portable information terminal 20, a process of obtaining a passcode PA from the management server 30 (hereinafter, referred to as a "passcode obtaining process") is performed (step S120).

Figure 5:
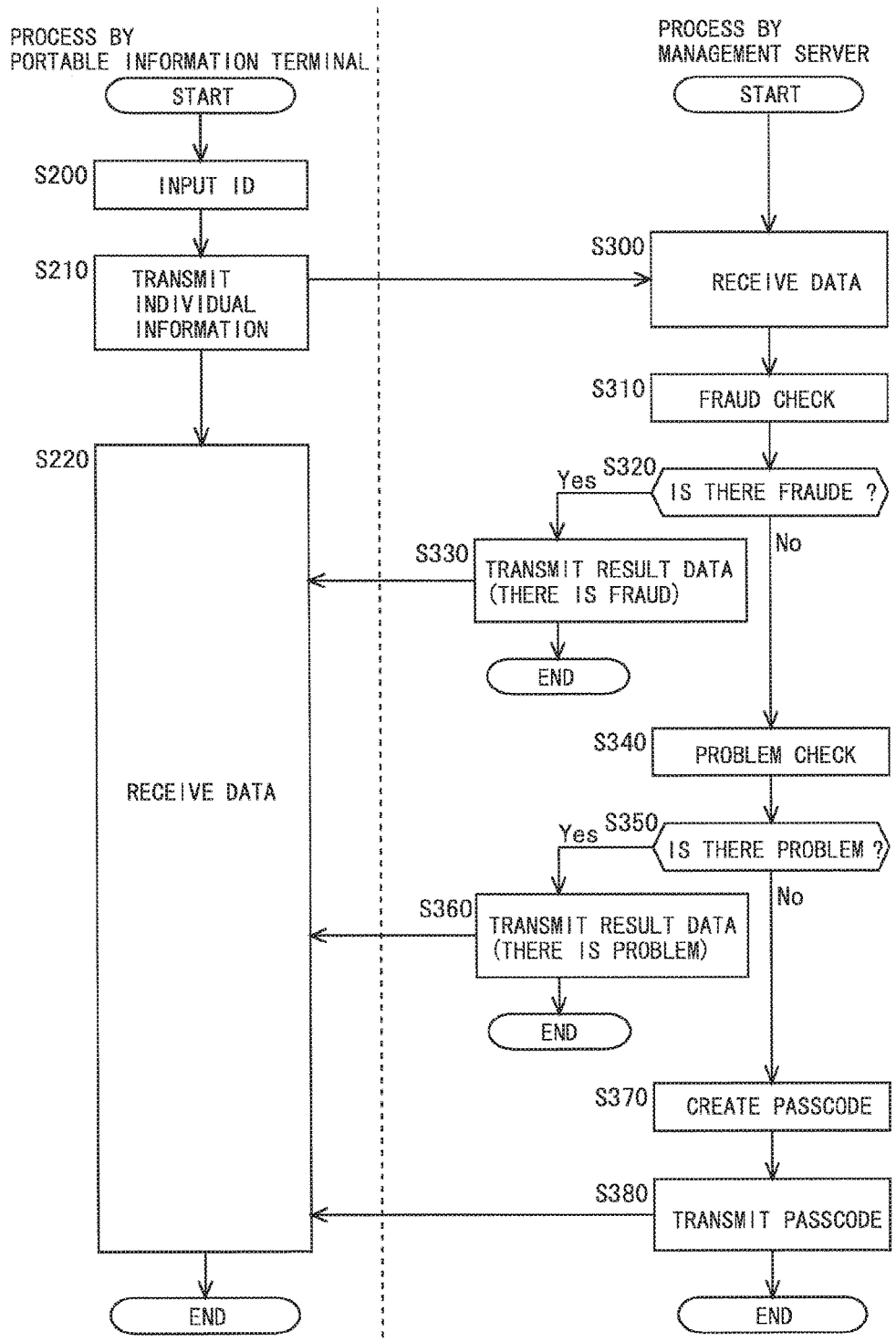
FIG. 5 is a flowchart showing a detailed procedure of a passcode obtaining process in the first embodiment.
Figure 6:
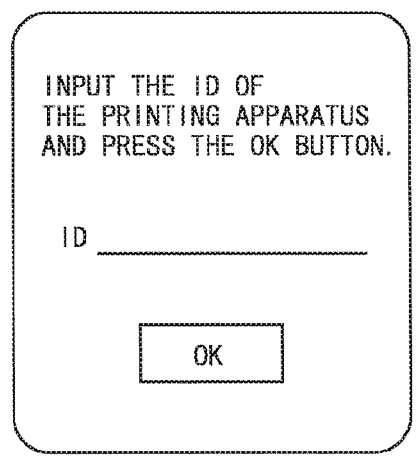
FIG. 6 is a diagram showing an example of a screen to input an ID of an inkjet printing apparatus in the first embodiment.

FIG. 5 is a flowchart showing a detailed procedure of the passcode obtaining process (step S120 of FIG. 2). After reading the two-dimensional code 40 (step S110 of FIG. 2), first, for example, as shown in FIG. 6, a screen to input an ID of the inkjet printing apparatus 10 that uses the target bottle 50 is displayed on a display unit of the portable information terminal 20. The inkjet printing apparatus 10 is assigned a unique ID in advance, and the user inputs the ID (step S200). When the ID is inputted properly, the individual information CI embedded in the two-dimensional code 40 is transmitted from the portable information terminal 20 to the management server 30 (step S210). Note that, when the ID is not inputted properly, for example, an error message is displayed on the display unit of the portable information terminal 20 and the process ends.

When the individual information CI is transmitted from the portable information terminal 20, the management server 30 receives the individual information CI (step S300). Meanwhile, since the ID of the inkjet printing apparatus 10 is inputted at step S200 as described above, the management server 30 can manage, for each ID, the received individual information CI. For example, by managing, for each ID, a history of the individual information CI along with information on dates on which pieces of individual information CI are received, the frequency of purchase of ink, the types of ink used, etc., can be grasped for each inkjet printing apparatus. Since the status of use of ink can be thus grasped in real time, it is also possible to use the received individual information CI for marketing.

After the management server 30 receives the individual information CI, first, the management server 30 performs a fraud check (step 3310). The fraud check is performed, for example, as follows. Every time a bottle 50 is shipped from a factory, etc., a serial number of the shipped bottle 50 is registered as shipping information SI in the management server 30. Then, when individual information CI is sent from the portable information terminal 20, the management server 30 searches the shipping information SI to check whether there is registered a serial number that matches a serial number included in the individual information CI. When, as a result, the target serial number is registered, it is determined that the bottle 50 is authentic (determined that "there is no fraud"). When the target serial number is not registered, it is determined that the bottle 50 is fraudulent (determined that "there is fraud"). In this manner, the fraud check is performed.

When it is determined as a result of the fraud check that "there is fraud", processing proceeds to step S330, and when it is determined that "there is no fraud", processing proceeds to step S340 (step S320). At step S330, data representing that the bottle 50 is fraudulent is transmitted as result data RD from the management server 30 to the portable information terminal 20.

At step S340, a problem check is performed. The problem check is performed, for example, as follows. When it is found after the shipment of a bottle 50 that there is a problem with ink contained in the bottle 50, a lot number of the ink with a problem is registered as problem information FI in the management server 30. Then, the management server 30 searches the problem information FI to check whether there is registered a lot number that matches a lot number included in the individual information CI sent from the portable information terminal 20. When, as a result, the target lot number is not registered, it is determined that there is no problem with the ink (determined that "there is no problem"), and when the lot number is registered, it is determined that there is a problem with the ink (determined that "there is a problem"). In this manner, the problem check is performed. Note that when there is a problem with ink with a plurality of consecutive lot numbers, for example, problem information FI may be registered by specifying a range such as "KY000195 to KY000220", and upon a problem check, a search according thereto may be performed.

When it is determined as a result of the problem check that "there is a problem", processing proceeds to step S360, and when it is determined that "there is no problem", processing proceeds to step 3370 (step S350). At step S360, data representing that there is a problem is transmitted as result data RD from the management server 30 to the portable information terminal 20.

At step S370, a passcode PA is created. The passcode PA is created using the individual information CI sent from the portable information terminal 20 and according to a predetermined rule (logic). At that time, by using the serial number included in the individual information CI, a passcode PA different for each bottle 50 can be created, i.e., the uniqueness of a passcode PA can be ensured. After creating the passcode PA, the management server 30 transmits the passcode PA as result data RD to the portable information terminal 20 (step S380).

In the above-described manner, any of data representing that the bottle 50 is fraudulent, data representing that there is a problem, and a passcode PA is sent as result data RD from the management server 30 to the portable information terminal 20. Then, the portable information terminal 20 receives the result data RD sent from the management server 30 (step S220).

By the portable information terminal 20 receiving the result data RD sent from the management server 30, the passcode obtaining process (step S120 of FIG. 2) ends. Note that specific techniques for a fraud check and a problem check are not limited to those described above. Note also that when the purpose is to prevent the use of ink whose problem is found after shipment, a fraud check does not necessarily need to be performed.

After the passcode obtaining process ends, the portable information terminal 20 determines the result of the passcode obtaining process (step S130 of FIG. 2). When, as a result of the determination, data representing that the bottle 50 is fraudulent is received, processing proceeds to step S140, when data representing that there is a problem is received, processing proceeds to step S142, and when a passcode PA is received, processing proceeds to step S150.

Figure 7:
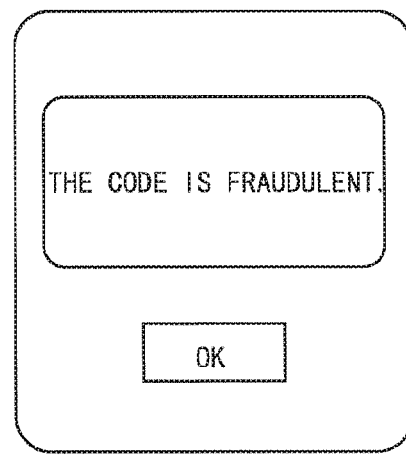
FIG. 7 is a diagram showing exemplary display provided when a code is fraudulent in the first embodiment.
Figure 8:
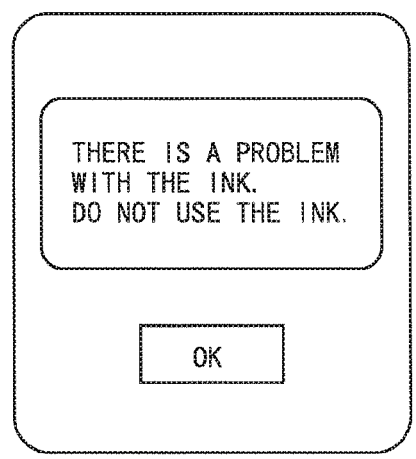
FIG. 8 is a diagram showing exemplary display provided when there is a problem with ink in the first embodiment.

At step S140, for example, as shown in FIG. 7, a message indicating that the code is fraudulent (the bottle 50 is fraudulent) is displayed on the display unit of the portable information terminal 20. By this, the process ends. At step S142, for example, as shown in FIG. 8, a message indicating that there is a problem with the ink is displayed on the display unit of the portable information terminal 20. By this, the process ends.

Figure 9:
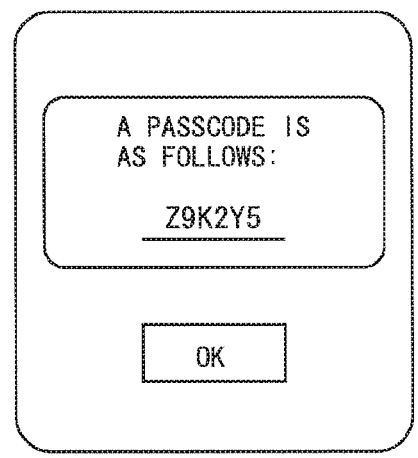
FIG. 9 is a diagram showing exemplary display of a passcode in the first embodiment.
Figure 10:
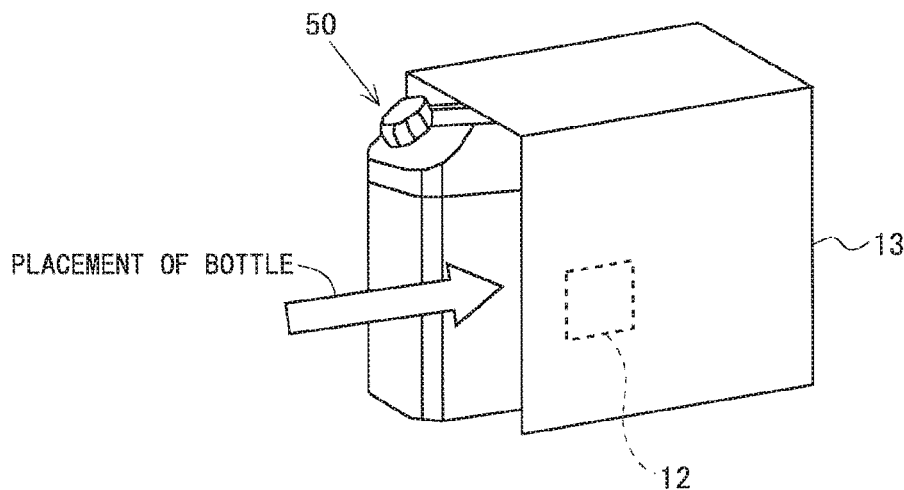
FIG. 10 is a diagram showing a state in which a bottle is placed in a bottle storing unit in the first embodiment.

At step S150, for example, as shown in FIG. 9, the passcode PA sent from the management server 30 is displayed on the display unit of the portable information terminal 20. Thereafter, the user registers the passcode PA in the print control apparatus 11 (step S160). After registering the passcode PA, as shown in FIG. 10, the user places the bottle 50 in a predetermined bottle storing unit 13 provided in the inkjet printing apparatus 10, to start to use the ink contained in the bottle 50 (step S170). By this, the two-dimensional code 40 attached to the bottle 50 is read by the two-dimensional code reader 12 (step S180). Then, the print control apparatus 11 performs a process of verifying whether authentication has been performed properly (hereinafter, referred to as an "authentication verification process") (step S190).

Figure 11:
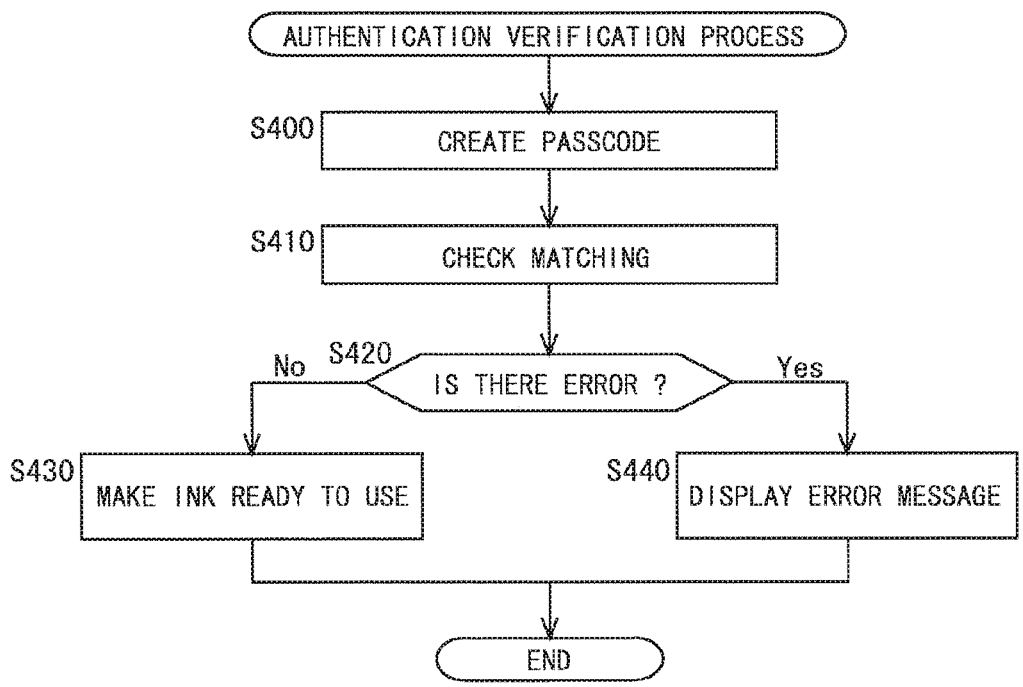
FIG. 11 is a flowchart showing a detailed procedure of an authentication verification process in the first embodiment.

FIG. 11 is a flowchart showing a detailed procedure of the authentication verification process (step S190 of FIG. 2). After reading the two-dimensional code 40 (step S180 of FIG. 2), first, a passcode PA is created (step S400). Here, a passcode PA is created using the individual information CI embedded in the two-dimensional code 40 read by the two-dimensional code reader 12 and according to the same rule as that used when the management server 30 creates a passcode PA.

Thereafter, the matching between the passcodes PA is checked (step S410). More specifically, the passcode PA registered by the user in the print control apparatus 11 at step S160 (see FIG. 2) is compared with the passcode PA created by the print control apparatus 11 at step S400, by which the matching between the passcodes PA is checked. When, as a result, the passcodes PA match, it is determined that authentication has been performed properly (determined that "there is no error"), and when the passcodes PA do not match, it is determined that authentication has not been performed properly (determined that "there is error"). In this manner, the matching between the passcodes PA is checked.

Figure 12:
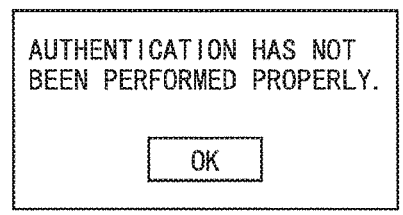
FIG. 12 is a diagram showing exemplary display provided when authentication has not been performed properly in the first embodiment.

When it is determined as a result of the matching check between the passcodes PA that "there is no error", processing proceeds to step S430, and when it is determined that "there is error", processing proceeds to step S440 (step S420). At step S430, the ink in the bottle 50 placed in the bottle storing unit 13 of the inkjet printing apparatus 10 becomes ready to use. At step S440, for example, as shown in FIG. 12, a message indicating that authentication has not been performed properly is displayed on a display unit of the print control apparatus 11.

In the above-described manner, only when the passcode PA that is registered by the user in the print control apparatus 11 upon the start of use of ink in the bottle 50 matches the passcode PA that is created by the print control apparatus 11 based on the two-dimensional code 40 attached to the bottle 50, the inkjet printing apparatus 10 can use the ink in the bottle 50.

Note that, in the present embodiment, a consumable shipping step is implemented by step S100 of FIG. 2, an individual information transmitting step is implemented by step S110 of FIG. 2 and step S210 of FIG. 5, a passcode transmitting step is implemented by step S300, S310, S340, S370, and S380 of FIG. 5, a passcode input accepting step is implemented by step S160 of FIG. 2, and a use-of-consumables allowed/not-allowed determining step is implemented by step S380 and S190 of FIG. 2.

<1.3 Effects>

According to the present embodiment, a bottle 50 for ink supply is shipped with a two-dimensional code 40 attached thereto, the two-dimensional code 40 having embedded therein individual information CI. When the user starts to use ink in the bottle 50, the user reads the two-dimensional code 40 with the portable information terminal 20 and thereby obtains a passcode PA from the management server 30, and registers the passcode PA in the print control apparatus 11. When the bottle 50 is placed in the bottle storing unit 13, the two-dimensional code 40 is read by the two-dimensional code reader 12, and a passcode PA is created by the print control apparatus 11 based on the individual information CI embedded in the two-dimensional code 40. Then, only when the passcode PA registered by the user matches the passcode PA created by the print control apparatus 11, the ink in the bottle 50 becomes ready to use. Here, when problem information FI about the target bottle 50 is registered in the management server 30, a passcode PA is not transmitted from the management server 30 to the portable information terminal 20. That is, only when there is no problem with the ink in the target bottle 50, the user can obtain a passcode PA. Therefore, when there is a problem with the ink, the user cannot make the ink ready to use, and thus, the ink with a problem is inhibited from being put in the inkjet printing apparatus 10. As such, upon the start of use of ink, a check as to whether there is a problem with the ink is performed in real time. Thus, use of ink with a problem is inhibited, and as a result, an increase in spoilage is prevented.

Figure 13:
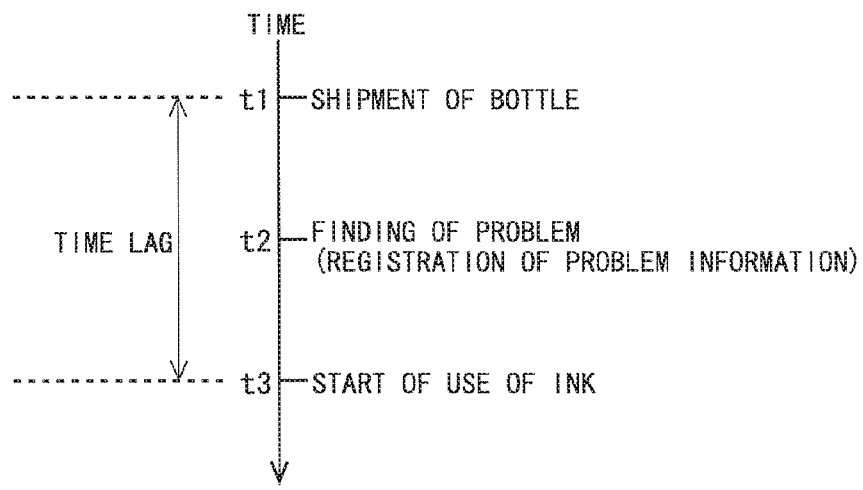
FIG. 13 is a diagram for describing an effect in the first embodiment.

Here, for example, it is assumed that there is a time lag such as that shown in FIG. 13 between time point t1 at which a bottle 50 is shipped and time point t3 at which the user starts to use ink in the bottle 50. In such a case, according to a conventional appropriateness check, whatever the time point at which a problem is found, the problem cannot be detected. On the other hand, according to the present embodiment, when a problem is found at time point t2 that is before time point t3 at which the user starts to use ink, the problem is detected based on problem information FI registered in the management server 30.

As described above, according to the present embodiment, when a problem with ink contained in a bottle 50 for ink supply is found after shipment, use of the ink (putting of the ink in the inkjet printing apparatus 10) can be inhibited.

In addition, according to the present embodiment, since what is attached to the bottle 50 for ink supply is a two-dimensional code, the weight and shape of the bottle 50 do not change from the conventional ones. Therefore, the delivery and storage of bottle 50 can be performed in the same manner as conventional cases.

Furthermore, by managing, for each ID, individual information CI, it is possible to grasp, for each inkjet printing apparatus, the frequency of purchase of ink, the types of ink used, etc. Since the status of use of ink can be grasped in real time in this manner, marketing operations can be performed more effectively over conventional cases.

2. Second Embodiment

Figure 14:
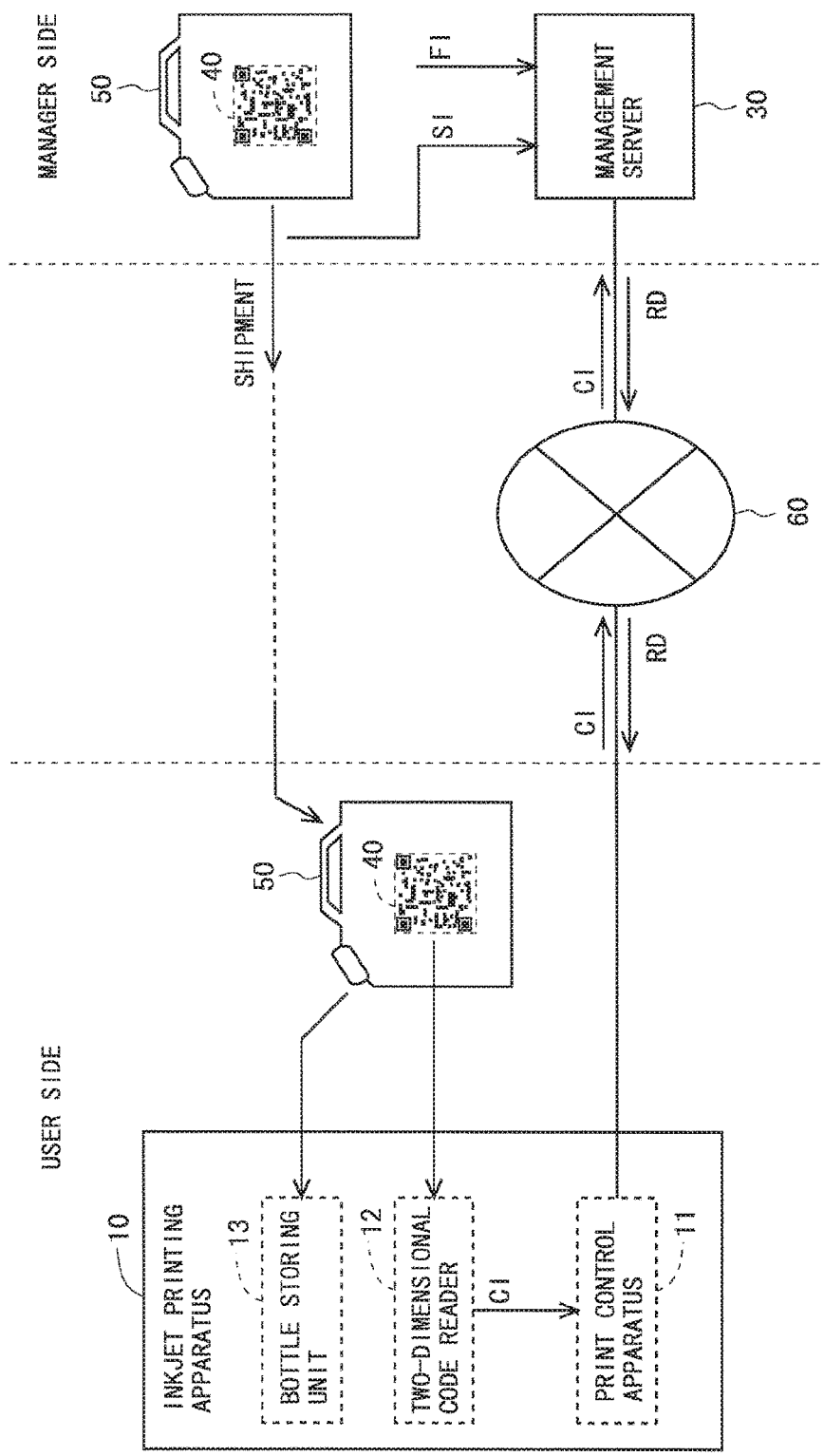
FIG. 14 is a diagram showing an overall configuration of an appropriateness-of-use-of-consumables management system according to a second embodiment of the present invention.

A second embodiment of the present invention will be described. As in the above-described first embodiment, a system according to the present embodiment is also a system (appropriateness-of-use-of-consumables management system) for managing appropriateness of use of ink which are consumables to be used for printing on an inkjet printing apparatus. Note that description of the same points as those of the first embodiment is omitted as appropriate.
<2.1 Overall Configuration and Overview of the System>
FIG. 14 is a diagram showing an overall configuration of an appropriateness-of-use-of-consumables management system according to the present embodiment. The appropriateness-of-use-of-consumables management system includes an inkjet printing apparatus 10; a management server 30; and a two-dimensional code 40 serving as an information recording unit having recorded therein individual information CI which is information on an each individual bottle 5C used to supply ink (information on ink contained in the bottle 50). The inkjet printing apparatus 10 is a component on the user side. The management server 30 is a component on the manager side. The two-dimensional code 40 is a component to be attached to the bottle 50 for ink supply when the bottle 50 is shipped. The inkjet printing apparatus 10 includes, as in the first embodiment, a print control apparatus 11, a two-dimensional code reader 12, and a bottle storing unit 13.

As can be grasped from FIGS. 14 and 1, in the present embodiment, unlike the first embodiment, a portable information terminal 20 is not used. In addition, in the present embodiment, unlike the first embodiment, the inkjet printing apparatus 10 is connected to Internet 60.

Under a configuration such as that described above, at the manager side, the same process as that of the first embodiment is performed. At the user side, a different process than that of the first embodiment is performed. Specifically, when the user uses the bottle 50, the user places the bottle 50 in the bottle storing unit 13 of the inkjet printing apparatus 10 without performing a process of obtaining a passcode PA from the management server 30 using a portable information terminal 20. By doing so, the two-dimensional code 40 attached to the bottle 50 is read by the two-dimensional code reader 12. Then, the individual information CI embedded in the two-dimensional code 40 is transmitted by the print control apparatus 11 to the management server 30. After the management server 30 performs the same process as that of the first embodiment, result data RD is transmitted from the management server 30 to the print control apparatus 11. When, based on the result data RD, there is no fraud or problem, the print control apparatus 11 performs an authentication verification process. When, as a result, it is verified that authentication has been performed properly, ink in the bottle 50 placed in the bottle storing unit 13 becomes ready to use.

Meanwhile, in the configuration according to the present embodiment, the management server 30 performs a process based on the individual information CI embedded in the two-dimensional code 40 which is read by the two-dimensional code reader 12 provided in the inkjet printing apparatus 10, and directly provides result data RD representing a result of the process to the print control apparatus 11. Hence, even when an authentication verification process by the print control apparatus 11 is omitted, in a case in which there is fraud or a problem, use of the target bottle 50 (use of the ink in the bottle 50) on the inkjet printing apparatus 10 can be prevented.

Figure 15:
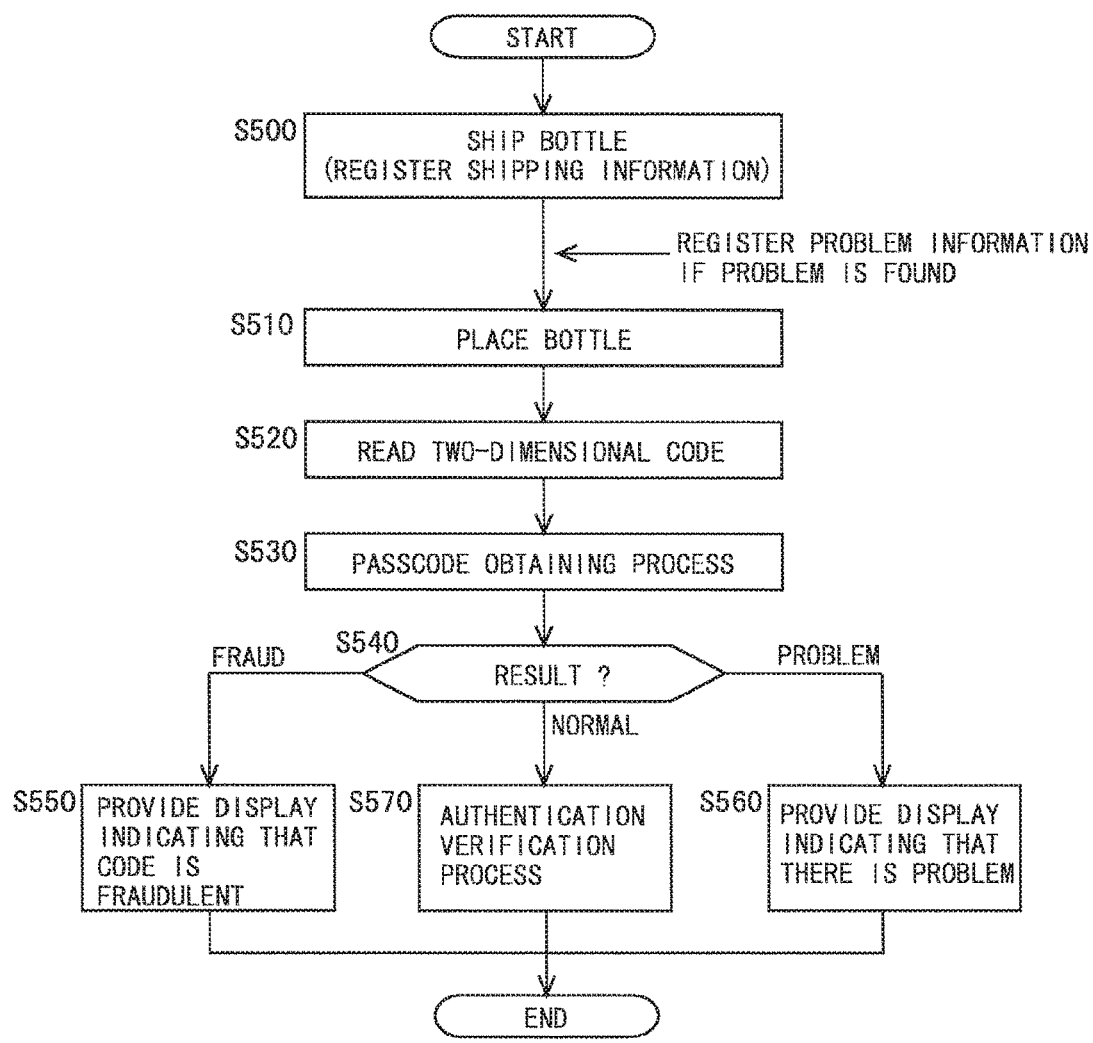
FIG. 15 is a flowchart showing an overall processing procedure of the appropriateness-of-use-of-consumables management system according to the second embodiment.

Note that, in the present embodiment, an information reading unit is implemented by the two-dimensional code reader 12, a management apparatus is implemented by the management server 30, and an information recording unit is implemented by the two-dimensional code 40.
<2.2 Detailed Procedure>
FIG. 15 is a flowchart showing an overall processing procedure of the appropriateness-of-use-of-consumables management system according to the present embodiment. First, a bottle 50 containing ink is shipped with a two-dimensional code 40 attached to a surface thereof (step S500). With the shipment, shipping information SI of the bottle 50 is registered in the management server 30. When it is found after the shipment of the bottle 50 that there is a problem with the ink contained in the bottle 50, problem information FI is registered in the management server 30.

After the user acquires the bottle 50, the user places the bottle 50 in a predetermined bottle storing unit 13 provided in the inkjet printing apparatus 10, to start to use the ink contained in the bottle 50 (step S510). By doing so, the two-dimensional code 40 attached to the bottle 50 is read by the two-dimensional code reader 12 (step S520). The two-dimensional code 40 also has URL information of the management server 30 embedded therein in addition to the individual information CI of the bottle 50, and thus, by the reading of the two-dimensional code 40, a process of obtaining a passcode from the management server 30 (passcode obtaining process) is performed (step S530).

The passcode obtaining process is the same as that of the first embodiment and thus description thereof is omitted (see FIG. 5). Note, however, that unlike the first embodiment, the processes at step S200 to S220 of FIG. 5 are performed by the print control apparatus 11 on the user side. Therefore, in the present embodiment, the transmission and reception of data are performed between the print control apparatus 11 and the management server 30.

After the passcode obtaining process ends, the print control apparatus 11 determines the result of the passcode obtaining process (step S540). When, as a result of the determination, data representing that the bottle 50 is fraudulent is received, processing proceeds to step S550, when data representing that there is a problem is received, processing proceeds to step S560, and when a passcode PA is received, processing proceeds to step S570.

At step S550, a message indicating that the code is fraudulent (the bottle 50 is fraudulent) is displayed on a display unit of the print control apparatus 11. By this, the process ends. At step S560, a message indicating that there is a problem with the ink is displayed on the display unit of the print control apparatus 11. By this, the process ends.

At step S570, the same authentication verification process as that of the first embodiment (see FIG. 11) is performed. Note, however, that in the present embodiment, a matching check (step S410 of FIG. 11) is performed by comparing the passcode PA sent from the management server 30 to the print control apparatus 11 with a passcode PA created by the print control apparatus 11. When it is determined in the authentication verification process that "there is no error", the ink in the bottle 50 placed in the bottle storing unit 13 of the inkjet printing apparatus 10 becomes ready to use.

Meanwhile, as described above, it is also possible to adopt a configuration in which an authentication verification process by the print control apparatus 11 is omitted. In this case, in a passcode obtaining process (see FIG. 5), when there is no fraud or problem, instead of creation and transmission of a passcode PA, data representing that there is no fraud or problem is transmitted as result data RD from the management server 30 to the print control apparatus 11. Then, when the print control apparatus 11 receives the data representing that there is no fraud or problem, the ink in the bottle 50 placed in the bottle storing unit 13 of the inkjet printing apparatus 10 becomes ready to use without performing an authentication verification process.

Note that, in the present embodiment, a consumables shipping step is implemented by step S500 of FIG. 15, an individual information transmitting step is implemented by step S520 of FIG. 15 and step S210 of FIG. 5, a result data transmitting step is implemented by step S300 to S380 of FIG. 5, and a use-of-consumables allowed/not-allowed determining step is implemented by step S540 and S570 of FIG. 15.

<2.3 Effect>

According to the present embodiment, as in the first embodiment, upon the start of use of ink, a check as to whether there is a problem with the ink is performed in real time. Here, in the present embodiment, unlike the first embodiment, the inkjet printing apparatus 10 is connected to the Internet 60, and thus, results of a fraud check and a problem check on the manager side are transmitted to the user side without the need for a user operation using a portable information terminal 20. As such, according to the present embodiment, in a case of adopting an environment where the inkjet printing apparatus 10 is connected to the Internet 60, when a problem with ink is found after shipment, use of the ink can be inhibited without increasing a user's operational burden.

3. Variants

Variants will be described below.

<3.1 First Variant>

In the above-described embodiments, the two-dimensional code 40 is used as an information recording unit having recorded therein individual information CI about each individual bottle 50 which is used to supply ink. However, the present invention is not limited thereto, and it is also possible to adopt a configuration in which, for example, an IC chip is used as the information recording unit. When this configuration is adopted to the first embodiment, the portable information terminal 20 is allowed to have the function of reading an IC chip and the inkjet printing apparatus 10 is provided with an IC chip reader instead of the two-dimensional code reader 12. In addition, when this configuration is adopted to the second embodiment, the inkjet printing apparatus 10 is provided with an IC chip reader instead of the two-dimensional code reader 12. In addition, it is also possible to use a one-dimensional code (so-called barcode) instead of the two-dimensional code 40.

<3.2 Second Variant>

In the above-described embodiments, the inkjet printing apparatus 10 is provided with the two-dimensional code reader 12 so that, when a bottle 50 for ink supply is placed in the bottle storing unit 13 of the inkjet printing apparatus 10, a two-dimensional code 40 attached to the bottle 50 is read. However, the present invention is not limited thereto. It is also possible to adopt a configuration (a configuration of the present variant) in which the two-dimensional code 40 is read using, for example, a handheld scanner instead of the two-dimensional code reader 12, and the read data is transferred to the print control apparatus 11.

Meanwhile, the ink refilling systems for an inkjet printing apparatus mainly include a system in which a bottle or the like (including a cartridge) is replaced (referred to as a "bottle replacement system" for convenience sake) and a system in which ink is refilled by pouring it into a fixed ink tank from a bottle (referred to as an "ink pouring system" for convenience sake). In the above-described embodiments, reading of the two-dimensional code 40 is performed by placing the bottle 50 in the bottle storing unit 13. Therefore, when an inkjet printing apparatus adopting the bottle replacement system is used, the configurations of the above-described embodiments can be adopted. On the other hand, when an inkjet printing apparatus adopting the ink pouring system is used, since placement of the bottle 50 in the bottle storing unit 13 is not performed, the configurations of the above-described embodiments cannot be adopted. Hence, when an inkjet printing apparatus adopting the ink pouring system is used, the configuration of the present variant may be adopted.

In the present variant, the inkjet printing apparatus 10 has an ink tank serving as a consumables holding unit that accepts the pouring of ink contained in a target bottle 50 and holds the ink in a ready-to-use state for printout, and when it is determined by the above-described authentication verification process that use of the ink contained in the target bottle 50 is not allowed, the inkjet printing apparatus 10 maintains a state in which the pouring of the ink into the ink tank is not allowed. Then, the operation of the inkjet printing apparatus 10 may be controlled such that, only when authentication has been performed properly without any fraud or problem, the pouring of ink is allowed by, for example, undoing a lock of an ink supply opening of the ink tank.

<3.3 Third Variant>

In general, in the bottle replacement system, an IC chip attached in advance to a bottle holds information on the amount of ink remaining, and every time printing is performed, the information on the amount of ink remaining is rewritten, by which the amount of ink remaining in the bottle (in other words, the amount of ink used) can be managed. On the other hand, in the ink pouring system, since ink is not used such that a bottle is placed in the bottle storing unit, the amount of ink remaining cannot be managed using the same technique as that of the bottle replacement system. Hence, in the present variant, when an inkjet printing apparatus adopting the ink pouring system is used, the amount of ink used is managed as follows.

In the present variant, the print control apparatus 11 holds, for each ink tank, information on the amount of ink allowed to be used. The amount of ink allowed to be used increases every time normal registration is performed to use ink in a bottle 50. Note that the normal registration as used here refers to that ink in a bottle 50 is made ready to use (a state in which the process at step S430 of FIG. 11 is performed) without any fraud or problem by the above-described procedures (see FIGS. 2, 5, 11, 15, etc.). Then, every time the ink is used by printout, the amount of ink allowed to be used decreases by the amount of ink used. When the amount of ink allowed to be used reaches 0, the inkjet printing apparatus 10 is brought into an unprintable state. In this manner, the amount of ink used is managed in a software manner. A procedure performed by the print control apparatus 11 will be described in detail below.

Figure 16:
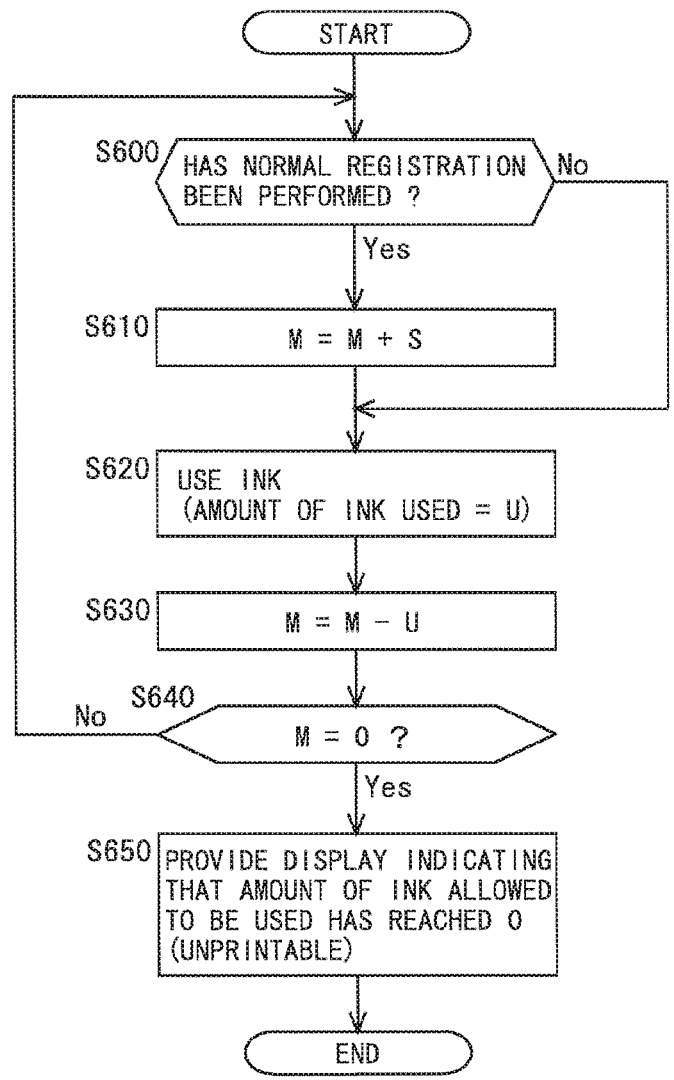
FIG. 16 is a flowchart showing a procedure of management of the amount of ink used in a third variant.

FIG. 16 is a flowchart showing a procedure of management of the amount of ink used in the present variant. Note that here the amount of ink allowed to be used is represented by reference character M, the volume of a normally-registered bottle 50 is represented by reference character S, and the amount of ink used by printing (the amount of ink used) is represented by reference character U. After the operation of the print control apparatus 11 starts, first, it is determined whether normal registration has been performed (step S600). When, as a result of the determination, normal registration has not been performed, processing proceeds to step S620. On the other hand, when normal registration has been performed, the volume S of the normally-registered bottle 50 is added to the amount M of ink allowed to be used (step S610), and processing proceeds to step S620.

At step S620, the ink is used by printout. By this, the amount M of ink allowed to be used is reduced by the amount U of ink used at step S620 (step S630). Thereafter, it is determined whether the amount M of ink allowed to be used has reached 0 (or whether the amount M of ink allowed to be used has reached 0 or less) (step S640). When, as a result of the determination, the amount M of ink allowed to be used has not reached 0, processing returns to step S600, and when the amount M of ink allowed to be used has reached 0, processing proceeds to step S650. Note that the processes from step S600 to S640 are repeated every time only a very small amount of ink is used.

At step S650, a message indicating that the amount of target ink allowed to be used has reached 0 is displayed on the display unit of the print control apparatus 11. Then, the inkjet printing apparatus 10 goes into an unprintable state.

As described above, according to the present variant, also when an inkjet printing apparatus adopting the ink pouring system is used, the amount of ink used can be managed.
<3.4 Fourth Variant>

In recent years, an inkjet printing apparatus has been used for printing in various fields. In this regard, an inkjet printing apparatus is sometimes used for printing for food. For printing for food, in terms of safety, for example, low-migration ink is used. Meanwhile, when an inkjet printing apparatus that is used for printing for food uses ink other than ink for food even once, it is not desirable to use the inkjet printing apparatus for printing for food again for safety reasons. Therefore, when ink is erroneously used, the inkjet printing apparatus may not be able to be used in a desired application. In view of this, it is also possible to adopt a configuration (a configuration in the present variant) in which the management server 30 performs a compatibility check such as that described below, in addition to a fraud check and a problem check.

In the present variant, when the management server 30 receives individual information CI sent from the user side, the management server 30 holds, together with ID information, information by which at least the type of ink can be identified among the individual information CI. Then, the management server 30 checks, for each ID, whether there is compatibility in the type of ink between individual information CI received last time and individual information CI received this time, before performing, for example, a problem check (step S340 of FIG. 5). When, as a result, there is no compatibility, data representing that there is no compatibility is transmitted as result data RD from the management server 30 to the user side. In this manner, ink that is not compatible with ink being used is prevented from being put in the inkjet printing apparatus 10.
<3.5 Fifth Variant>

In the first embodiment, the user places a target bottle 50 in the bottle storing unit 13 of the inkjet printing apparatus 10 after registering, in the print control apparatus 11, a passcode PA obtained from the management server 30 using the portable information terminal 20. Since such a procedure is taken, a time lag may occur between when the passcode PA is obtained from the management server 30 and when ink in the bottle 50 is actually started to be used. When such an operation is performed, the real-time property of an appropriateness check is lost. In view of this, in the present variant, in order to secure the real-time property of an appropriateness check, an expiration date is set for a passcode PA.

In the present variant, when the management server 30 creates a passcode PA, a date a predetermined number of days (e.g., three days) after the date of the creation of the passcode PA is set as an expiration date. Then, using the set expiration date as a key, encryption is performed on, for example, a serial number included in individual information CI. A code that represents a result obtained by the encryption in Base64 format is presented as a passcode PA to the user.

Meanwhile, as described above, the creation of a passcode PA by the print control apparatus 11 is performed according to the same rule as that used for the creation of a passcode PA by the management server 30. Due to this, even when the creation of a passcode PA by the print control apparatus 11 is performed within an expiration date, when the date of creation of a passcode PA by the management server 30 differs from the date of the creation of the passcode PA by the print control apparatus 11, those two passcodes PA do not match, which will be described below with reference to FIG. 17.

It is assumed that, when the management server 30 creates a passcode PA, for example, a date three days after the date of the creation of the passcode PA is set as an expiration date. In other words, it is assumed that the valid period of the passcode PA is set to three days. In this case, when the management server 30 creates a passcode PA on Oct. 15, 2016, its expiration date is Oct. 18, 2016. On the other hand, when the print control apparatus 11 creates a passcode PA on Oct. 17, 2016, its expiration date is Oct. 20, 2016. Here, since encryption for creating a passcode PA is performed using an expiration date as a key, the two passcodes PA do not match. Hence, when such a mismatch between the passcodes PA occurs, the print control apparatus 11 re-creates a passcode PA with an expiration date used as a key being set to a date one day before the actual expiration date, and compares the two passcodes PA again. Such a process is repeated until an expiration date used as a key reaches a date a number of days of the valid period at maximum before the actual expiration date.

Figure 17:
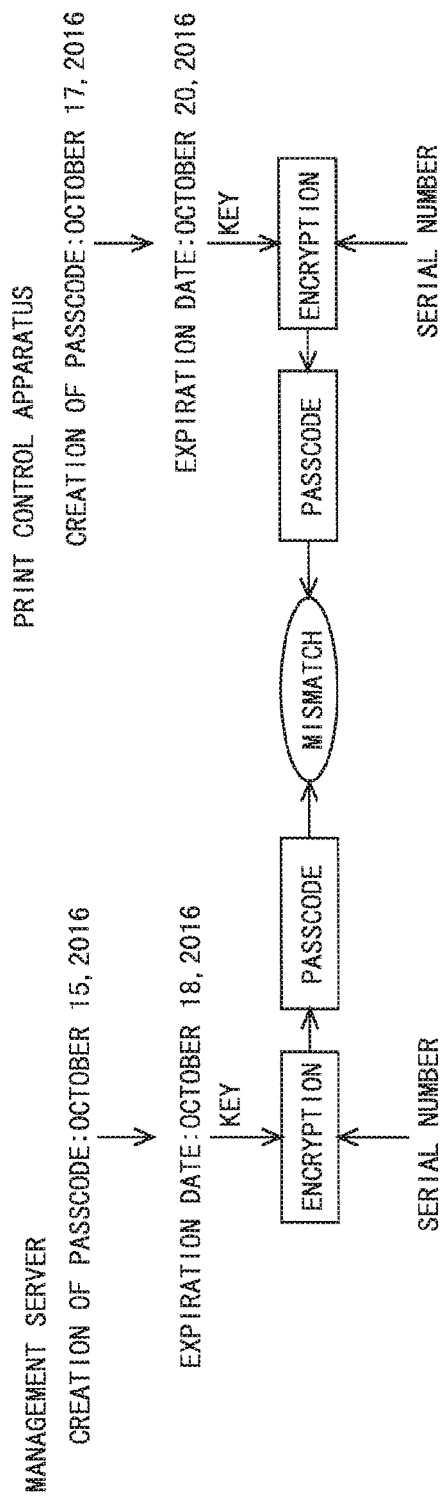
FIG. 17 is a diagram for describing a mismatch between passcodes regarding a fifth variant.

In an example shown in FIG. 17, with an expiration date used as an encryption key being set to Oct. 19, 2016, the print control apparatus 11 creates a passcode PA for the second time. Then, furthermore, with an expiration date used as an encryption key being set to Oct. 18, 2016, the print control apparatus 11 creates a passcode PA for the third time. At that time, the passcode PA created by the management server 30 matches the passcode PA created by the print control apparatus 11. Now, it is assumed that a passcode PA is created by the print control apparatus 11 on Oct. 19, 2016. In this case, the earliest date that can be set as an expiration date used as an encryption key for re-creation of a passcode PA by the print control apparatus 11 is Oct. 19, 2016, and thus, the two passcodes PA do not match. In this manner, by adopting a configuration in which a passcode PA created by the management server 30 is compared with a passcode PA created by the print control apparatus 11 with an expiration date set to a date a number of days of the valid period at maximum before the actual expiration date, ink in a target bottle 50 becomes ready to use only within the valid period of the passcode PA, securing the real-time property of an appropriateness check.

Now, a procedure of the creation of a passcode and a matching check in the print control apparatus 11 in the present variant will be described with reference to a flowchart shown in FIG. 18. In the present variant, processes at step S700 to S760 of FIG. 18 are performed instead of the processes at step S400 and S410 (see FIG. 11) in the first embodiment. This process uses a variable Dx representing the number of times a passcode PA is created and a variable Dn representing a valid period (days) of a passcode PA. Note that a specific procedure is not limited to that described here.

After an authentication verification process starts, first, the variable Dx is set to 0, and the variable Dn is set to a numerical value representing the valid period (days) of a passcode PA (step S700). Then, based on the current date, an expiration date used as an encryption key for the creation of a passcode PA is set (step S710). More specifically, a date a number of days of the valid period of the passcode PA after the current date is set as an expiration date.

Thereafter, encryption (e.g., encryption of a serial number included in individual information CI) is performed using the set expiration date as a key, by which a passcode PA is created (step S720). Then, it is determined whether a passcode PA registered in the print control apparatus 11 at step S160 of FIG. 2 matches the passcode PA created at step S720 (step S730). Note that it is assumed that a passcode PA created by the management server 3C is registered in the print control apparatus 11 at step S160 of FIG. 2. When, as a result of the determination at step S730, the passcodes PA match, processing proceeds to step S420 of FIG. 11. At this time, at step S420, it is determined that "there is no error". On the other hand, when the passcodes PA do not match, processing proceeds to step S740.

At step S740, it is determined whether the value of the variable Dx is larger than the value of the variable Dn. When, as a result of the determination, the value of the variable Dx is larger than the value of the variable Dn, processing proceeds to step S420 of FIG. 11. At this time, at step S420, it is determined that "there is error". On the other hand, when the value of the variable Dx is less than or equal to the value of the variable Dn, processing proceeds to step S750. At step S750, an expiration date used as an encryption key for the creation of a passcode PA is set to a date one day earlier. Thereafter, "1" is added to the value of the variable Dx (step S760). Thereafter, processing returns to step S720 and a passcode PA is re-created.

In the above-described manner, only when ink is started to be used on the user side (a target bottle 50 is placed in the bottle storing unit 13 of the inkjet printing apparatus 10) before an expiration date set by the management server 30 expires, the ink in the target bottle 50 becomes ready to use. As such, according to the present variant, the real-time property of an appropriateness check is secured.

Note that when the start of use of the ink on the user side takes place after the expiration date set by the management server 30 expires, the user redoes a process from the reading of a two-dimensional code 40 using the portable information terminal 20 (step S110 of FIG. 2).

<3.6 Sixth Variant>

The above-described embodiments describe an example case in which the inkjet printing apparatus 10 is used as a printing apparatus (i.e., a case in which consumables used for printing are ink). However, the present invention is not limited thereto, and the present invention can also be applied to a case in which consumables used for printing are other than ink. For example, the present invention can also be applied to a case of using a laser printer that performs printing using toners as colorants.

Although the present invention has been described in detail above, the above description is to be considered in all respects as illustrative and not restrictive. It will be understood that many other changes and modifications may be made without departing from the sprit and scope of the present invention.

Note that this application claims priority to Japanese Patent Application No. 2016-176620 titled "System for Managing Appropriateness of Use of Consumables for Printing Apparatus and Method for Managing Appropriateness of Use of Consumables for Printing Apparatus" filed Sep. 9, 2016, the content of which is incorporated herein by reference.

What is claimed is:

1. A system for managing appropriateness of use of consumables for a printing apparatus, the system comprising:
    an information recording unit attached to a container containing consumables for a printing apparatus, individual information of the container being recorded in the information recording unit;
    a management apparatus configured to hold and manage quality information about consumables contained in each container, in association with the individual information; and
    a printing apparatus including an information reading unit configured to read the individual information recorded in the information recording unit; and configured to be connectable to the management apparatus, the printing apparatus performing printout using the consumables, wherein
    the management apparatus is a server remotely located from the printing apparatus,
    the management apparatus and the printing apparatus are two mutually independent apparatuses connected to each other through the Internet,
    the printing apparatus reads, by the information reading unit, individual information recorded in an information recording unit attached to a target container, and transmits the read individual information to the management apparatus, the management apparatus receives the individual information transmitted from the printing apparatus, determines, based on the quality information, whether to allow use of consumables contained in the container corresponding to the received individual information, and transmits result data representing a result of the determination to the printing apparatus, the printing apparatus determines, based on the result data transmitted from the management apparatus, whether to allow use of the consumables contained in the target container, when the management apparatus determines to allow use of the consumables, the management apparatus creates a passcode whose uniqueness is ensured, based on the received individual information and transmits the created passcode as the result data to the printing apparatus, and when the management apparatus determines not to allow use of the consumables, the management apparatus transmits data representing that there is a problem as the result data to the printing apparatus.

2. The system for managing appropriateness of use of consumables for a printing apparatus according to claim 1, wherein the printing apparatus performs a predetermined authentication verification process based on the individual information read by the information reading unit from the information recording unit attached to the target container and the passcode transmitted as the result data from the management apparatus, to determine whether to allow use of the consumables contained in the target container.

3. The system for managing appropriateness of use of consumables for a printing apparatus according to claim 1, wherein the quality information is a problem information about the consumables.

4. The system for managing appropriateness of use of consumables for a printing apparatus according to claim 3, wherein the problem information represents whether there is mixing of foreign matter found after a shipment of the container.

5. The system for managing appropriateness of use of consumables for a printing apparatus according to claim 1, wherein the quality information is uploaded by a manager that manages the appropriateness of use of consumables.

6. The system for managing appropriateness of use of consumables for a printing apparatus according to claim 1, wherein serial number information is recorded as the individual information in the information recording unit, and the passcode is created by the management apparatus using the serial number information.

7. The system for managing appropriateness of use of consumables for a printing apparatus according to claim 1, wherein the management apparatus hold and manage shipping information about the container in association with the individual information, and performs fraud check based on the received individual information and the shipping information.

8. The system for managing appropriateness of use of consumables for a printing apparatus according to claim 1, wherein URL information of the management apparatus is recorded in the information recording unit.

9. The system for managing appropriateness of use of consumables for a printing apparatus according to claim 1, wherein the printing apparatus further includes a consumables holding unit configured to accept pouring of the consumables contained in the target container and hold the consumables in a ready-to-use state for printout, and when the printing apparatus determines not to allow use of the consumables contained in the target container, the printing apparatus maintains a state in which pouring of the consumables into the consumable holding unit is not allowed, and when the printing apparatus determines to allow use of the consumables contained in the target container, the printing apparatus allows pouring of the consumables into the consumable holding unit.

10. The system for managing appropriateness of use of consumables for a printing apparatus according to claim 9, wherein the printing apparatus:

increases an amount of the consumables allowed to be used, every time pouring of the consumables into the consumable holding unit is allowed;

decreases the amount of the consumables allowed to be used, depending on use of the consumables by printout; and does not allow printout using the consumables when the amount of the consumable allowed to be used reaches zero.

11. The system for managing appropriateness of use of consumables for a printing apparatus according to claim 1, wherein the consumables are ink.

12. The system for managing appropriateness of use of consumables for a printing apparatus according to claim 1, wherein the printing apparatus further includes a container storing unit configured to store the container, and the reading of the individual information by the information reading unit is performed by storing the target container in the container storing unit.

13. The system for managing appropriateness of use of consumables for a printing apparatus according to claim 1, wherein the information recording unit is a two-dimensional code, and the information reading unit is a two-dimensional code reader.

14. The system for managing appropriateness of use of consumables for a printing apparatus according to claim 1, wherein lot number information is recorded as the individual information in the information recording unit.

15. The system for managing appropriateness of use of consumables for a printing apparatus according to claim 1, wherein the printing apparatus creates a passcode using the individual information read by the information reading unit and in accordance with a same rule as a rule used when the management apparatus creates the passcode, and when the passcode created in the management apparatus matches the passcode created in the printing apparatus, the printing apparatus makes the consumables contained in the target container ready to use, and when the passcode created in the management apparatus does not match the passcode created in the printing apparatus, the printing apparatus displays a message indicating that authentication has not been performed properly.

\* \* \* \* \*